Aug. 4, 1964　　　　　　R. D. BECK　　　　　3,143,141
PNEUMATIC CONTROL DEVICE
Filed Oct. 30, 1961
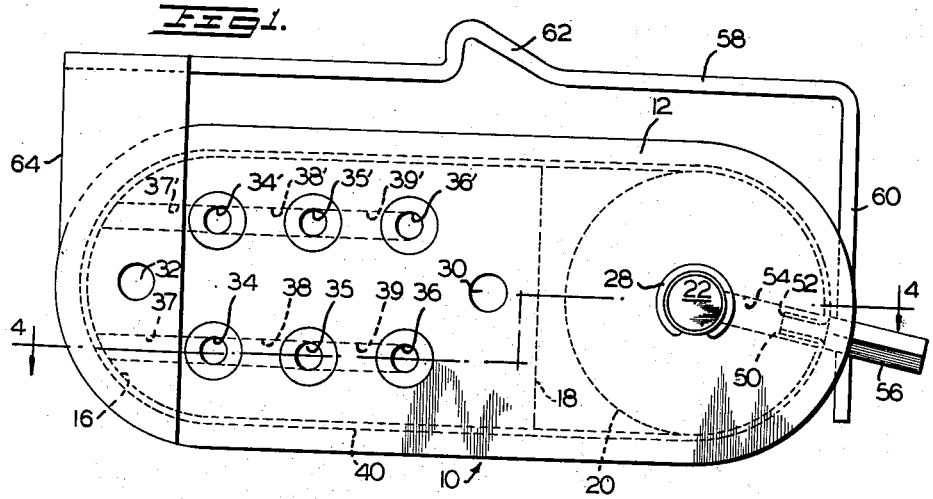
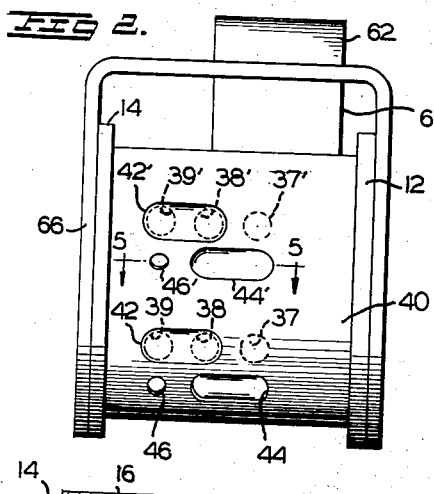
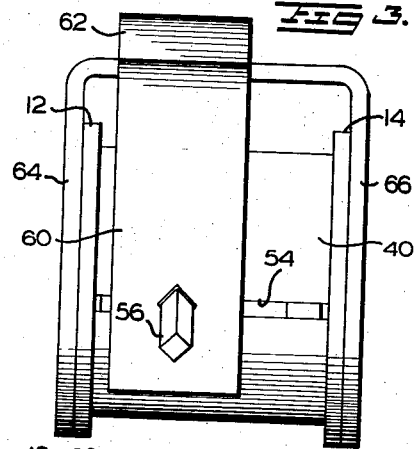
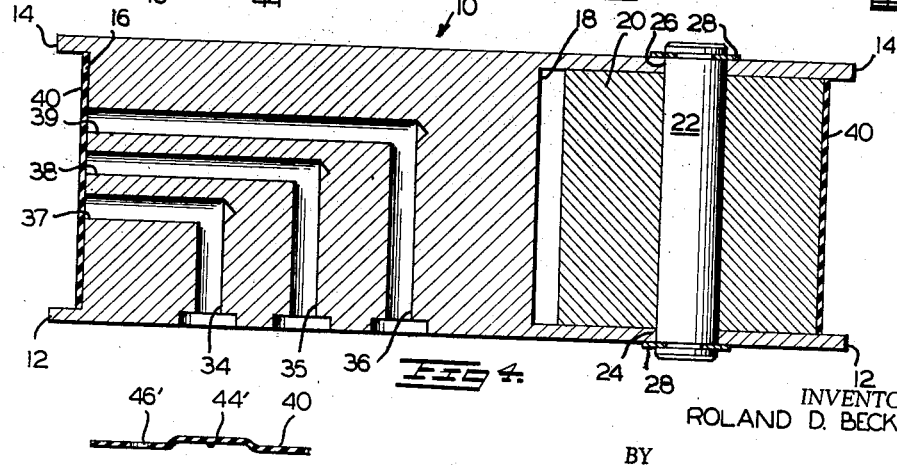
INVENTOR.
ROLAND D. BECK
BY Anthony A. O'Brien
ATTORNEY

United States Patent Office 3,143,141
Patented Aug. 4, 1964

3,143,141
PNEUMATIC CONTROL DEVICE
Roland D. Beck, Anaheim, Calif., assignor to Robertshaw Controls Company, a corporation of Delaware
Filed Oct. 30, 1961, Ser. No. 148,613
8 Claims. (Cl. 137—625.2)

This invention relates to pneumatic control devices, and more specifically to a device for selectively directing a pneumatic flow between a source and terminal points to which the pneumatic flow is to be applied.

In order to effectively provide for selective direction control of a pneumatic flow valve means must be supplied between the source and the terminal point of the flow. The valve means must operate so as to provide the desired direction control upon the application of some external force. The type of valve means supplied will determine the magnitude of the force necessary to actuate said valve means to properly direct the fluid pressure flow. It is an extremely important desideratum that the magnitude of the force required to actuate the valve means be as small as possible without detracting or impairing the operating characteristics of the control device.

Accordingly, it is an object of the present invention to provide an improved pneumatic control device for selectively directing a pneumatic flow.

It is a further object of the present invention to utilize a flexible tape as a valve means for directing a pneumatic flow in a control device.

It is a further object of the present invention to utilize a flexible tape valve for selective direction control of a pneumatic flow in a control device which will be responsive to minimal actuating forces.

It is a further object of the present invention to provide a pneumatic control device which may be manufactured and operated simply and inexpensively, and which prevents leakage, thus adapting it for use with smaller, inexpensive components.

In carrying out this invention, a valve body is provided with a plurality of conduits which have end portions adapted for connection to a pneumatic source and pneumatic responsive control devices and have opposite end portions communicating with a flexible tape. A series of blisters on the flexible tape establish communication between the end portions of adjacent conduits and the movement of the flexible tape effects control over the pneumatic flow.

Additional features and advantages of the present invention will become apparent from the following description of a preferred embodiment taken in connection with the accompanying drawing, wherein:

FIG. 1 is a side elevation of a pneumatic control device embodying the present invention;

FIG. 2 is a lift end view of the control device shown in FIG. 1;

FIG. 3 is a right end view of the control device shown in FIG. 1;

FIG. 4 is a sectional view taken along the staggered line 4—4 of FIG. 1; and

FIG. 5 is a sectional view of the flexible tape valve, taken along the line 5—5 of FIG. 2 showing the configuration of the apertures and the raised or blister-type channels thereon.

As is shown in the preferred embodiment of this invention in FIGS. 1 and 4, a valve body, indicated generally at 10, has a substantially rectangular configuration with peripheral flanges 12 and 14 on opposite sides. One end of the body 10 terminates in an arcuate portion 16 and the other end terminates in a flat portion 18. As best illustrated in FIG. 4, flanges 12 and 14 extend longitudinally beyond the flat end 18 so as to form a U-shaped support for a roller element 20. The roller 20 is rotatably mounted on a shaft 22 which extends through aligned openings 24 and 26 in the flanges 12 and 14, respectively. Suitable fastening means, such as a C-shaped snap ring 28 on each end of the shaft 22, retain the shaft 22 in position between the flanges 12 and 14. The dimension of the roller 22 is such that the flanges 12 and 14 have substantially the same dimensions adjacent the roller end of body 10 as adjacent the arcuate end 16.

Adjacent its flat end 18, the valve body 10 has a through-bore 30 for the reception of a mounting bolt or the like (not shown) whereby the body 10 may be secured to the machinery to be pneumatically controlled by such laundry apparatus. Adjacent its arcuate end 16, the valve body 10 has a second through-bore 32 for the reception of a second mounting bolt.

The valve body 10 is provided with an upper and lower series of L-shaped conduits which, for the purpose of description, consists of three conduits in each series; however, the actual number of conduits and the actual number of series may be varied in accordance with the particular installation as will become apparent hereinafter. The three lower conduits have branches 34, 35 and 36 opening into the side wall of body 10 and their connecting branches 37, 38 and 39, respectively, opening into the arcuate end 16. The three upper conduits are identified by the same reference numerals with a prime appended thereto and identical parts of corresponding elements will be likewise referenced hereinafter; it is to be understood that these three conduits may open into the opposite side wall of body 10. Suitable fittings or base connections may be fastened to the side wall of body 10 to facilitate connection with various pneumatic responsive devices and sources of pneumatic flow.

For cooperation with the openings 37, 38 and 39 in the arcuate end portion 16, there is provided a belt or flexible tape 40 of suitable plastic material which is disposed between the side flanges 12 and 14. The flexible tape 40 is formed with a plurality of raised or blister-like channels 42 having a generally rectangular configuration with a major dimension sufficient to span or establish communication between an adjacent pair of openings such as 38 and 39. Spaced below the blister 42, the flexible tape has a second similarly formed blister 44 for selective cooperation with the remaining pair of openings 37 and 38. The flexible tape is also formed with an aperture 46 disposed in alignment with the major axis of blister 44 (FIG. 5) for cooperation with opening 39 when blister 44 spans the remaining two openings 37 and 38.

An upper series of apertures and blisters are identified by the same reference numerals with a prime appended thereto and are disposed for cooperation with the three upper openings 37′, 38′ and 39′.

The flexible tape 40 extends around the valve body 10 and has end portions 50 and 52 insertable in a longitudinal slot 54 in the roller 20. A wedge 56 is inserted in the slot 36 and retains the tape ends 50 and 52 therein whereby the tape 40 will follow the movement of the roller 20. The outer end of wedge 56 has square-shaped cross-section and serves as an actuating lever for the roller 20.

A pivoted lever 58 has a leg 60 with a square-shaped aperture for receiving the outer end of wedge 56. Intermediate its ends the lever 58 has a portion contoured to form a cam follower segment 62. As is shown in FIGS. 1 and 2 the left end of lever 58 has two downwardly extending sides 64 and 66, the lower portions of which are arcuately shaped to conform to the arcuate ends of flanges 12 and 14. The sides 64 and 66 are journaled to the same bolt (not shown) extending through the bore 32 in any suitable manner os as to pivot about the bolt axis.

With the above arrangement, the wedge 56 may be manually moved in an up and down manner causing oscillation of the roller 20 about the axis defined by the shaft 22. In addition, the pivotal movement of the roller 20 may be automatically effected by a cam (not shown) engaging the cam follower 62 in some predetermined sequence. During this automatic operation the cam will engage the cam follower 62 causing the lever 58 to pivot about the axis defined by the bore 32 whereupon the lever leg 60 will move the wedge 56 for actuating the roller 20.

In the following description of the sequence of operation it will be assumed that the middle opening 35 is connected to a pneumatic source, that end openings 34 and 36 are connected to pneumatic responsive devices. The pneumatic responsive devices may be used for a variety of purposes, for example, to control the flow of water to a washing machine and to control a water pump for emptying a washing machine. While the pneumatic source may be pressure or vacuum as desired, a pneumatic vacuum source will be described as connected to the opening 35. With the flexible tape 40 in the position shown in FIG. 2, the opening 37 is sealed off so that the pneumatic responsive device connected to opening 34 is not disturbed from its prearranged position; in addition, there is no escape or bleed of the pneumatic flow because the pneumatic source is not connected to the opening 37 at this time. However, the tape blister 42 spans the two openings 38 and 39 and the pneumatic responsive device associated with opening 36 is actuated by a vacuum traced from such device, through openings 36 and 39, the blister 42, the openings 38 and 35 to a vacuum pump (not shown). By the use of vacuum and because of the flexibility of the tape 40, there is a suction on the undersurface of the blister 42 resulting in extremely effective seal between the sliding flexible tape 40 and the arcuate portion 16 which constitutes a reading head for the program on the tape as determined by the number and spacing of the channel-like blisters. It is to be noted that leakage is prevented with the above construction which permits the use of a very small vacuum pump as well as very small other components associated with the vacuum flow.

The movement of the flexible tape 40 is effected by the movement of the wedge lever 56 that can be made to respond to very small actuating forces which need be no larger than that necessary to overcome the frictional forces between the reading head and the sliding tape. Thus, a small actuating force on wedge lever 56 causes rotation of the roller 20 which in turn slides the flexible tape 40 to a new position where blister 44 spans the openings 37 and 38 and the aperture 46 registers with the opening 39. In this position of the flexible tape 40, the openings 39 and 36 and the pneumatic responsive device connected thereto are exhausted to the atmosphere through the tape aperture 46, whereby the pressure responsive device may return to its original position as, for example, shutting off the flow of water to the washing machine. At the same time, the tape blister 44 establishes communication between the openings 37 and 38 so that the pressure responsive device associated with the opening 34 is subjected to the vacuum in opening 38 and is actuated to its other operating position. It is now apparent that the flexible tape 40 slides in an oscillatory movement relative to the reading head in accordance with the oscillation of the wedge lever 56. Furthermore, the tape blisters 42', 44' and 46' may be simultaneously cooperating with the openings 37', 38' and 39' to control the actuation of other pneumatic responsive devices which are needed for the various operating cycles in a washing machine. The flexible tape 40 may be programmed to interconnect various pneumatic conduits in any desired sequence.

Inasmuch as the present invention is subjected to many modifications and various changes in details, it is intended that the foregoing description of the preferred embodiment shown in the drawing be interpreted as illustrative and not in a limiting sense.

What is claimed is:

1. In a device for controlling a pneumatic flow, the combination comprising, a body member, a plurality of conduits formed in said body member, means defining an opening for each of said conduits, a flexible tape slidably disposed on said body member, said flexible tape defining a transfer valve movable for operative positioning relative to said openings, and pneumatic flow means integrally formed on said flexible tape in raised relationship to said body member and establishing communication between said openings for transferring a pneumatic flow between said conduits.

2. The combination as recited in claim 1 wherein said pneumatic flow means comprises blister means raised out of said flexible tape.

3. In a device for controlling a pneumatic flow, the combination comprising a body member, a plurality of conduits formed in said body member, opening means for each end of each conduit, a tape element mounted on said body member and being slidable thereon for cooperation with the opening means on adjacent ends of said conduits, channel means integrally formed on said tape element in raised relationship to said body member and establishing communication between the opening means on the adjacent ends of said conduits whereby a pneumatic flow is permitted between said conduits, said channel means causing the tape element to be sealed to said body member during the pneumatic flow.

4. The combination as recited in claim 3 wherein said channel means comprises a plurality of blister means spaced on said tape element in a predetermined pattern to effect a selective sequence of interconnections between said plurality of conduits.

5. In a device for controlling a pneumatic flow from a pneumatic vacuum source, the combination comprising a body member having a plurality of spaced openings on one end, flexible valve means slidably engaging the one end of said body member for cooperation with said spaced openings, channel means integrally formed on said flexible valve means in raised relationship so as to be out of engagement with the one end of said body whereby a flow channel is established between said spaced openings, and means for moving said flexible valve means relative to the one end of said body to control a pneumatic flow between said spaced openings, said channel means being subject to suction during the pneumatic flow and causing the flexible valve means to be sealed to said one end of said body member.

6. The combination as recited in claim 5 wherein said channel means comprises a plurality of raised blisters arranged in a predetermined pattern on said flexible valve means to effect a selective sequence of communication between said plurality of spaced openings.

7. In a device for controlling pneumatic flow between a pneumatic source of vacuum and pneumatically operated control mechanisms, the combination comprising, a body member having an arcuate portion on one end and a roller support on another end, a roller element carried by said roller support, a plurality of conduits formed in said body member, each of said conduits having a terminal opening on said arcuate portion and a connection opening on another portion of said body member, a flexible tape covering said terminal openings and having end portions secured to said roller whereby said flexible tape slides relative to said arcuate portion in accordance with movement of said roller, a plurality of blisters integrally formed on said flexible tape in spaced relation and establishing communication between selected terminal openings whereby a vacuum flow is directed between the conduits associated with the communicating selected terminal openings, aperture means on said flexible tape cooperating with a selected terminal opening whereby the conduit associated therewith is exhausted to the atmosphere, lever means on said roller movable in an oscillatory manner whereby said flexible tape oscillates relative to said arcuate portion.

8. The combination as recited in claim 7 wherein a cam lever actuates said lever means.

References Cited in the file of this patent

UNITED STATES PATENTS

| | | |
|---|---|---|
| 1,902,064 | Ford | Mar. 21, 1933 |
| 2,530,622 | Maris | Nov. 21, 1950 |
| 2,678,063 | Ellis | May 11, 1954 |
| 3,029,841 | Bitzer | Apr. 17, 1962 |

FOREIGN PATENTS

| | | |
|---|---|---|
| 1,044,116 | Germany | Nov. 28, 1958 |